UNITED STATES PATENT OFFICE.

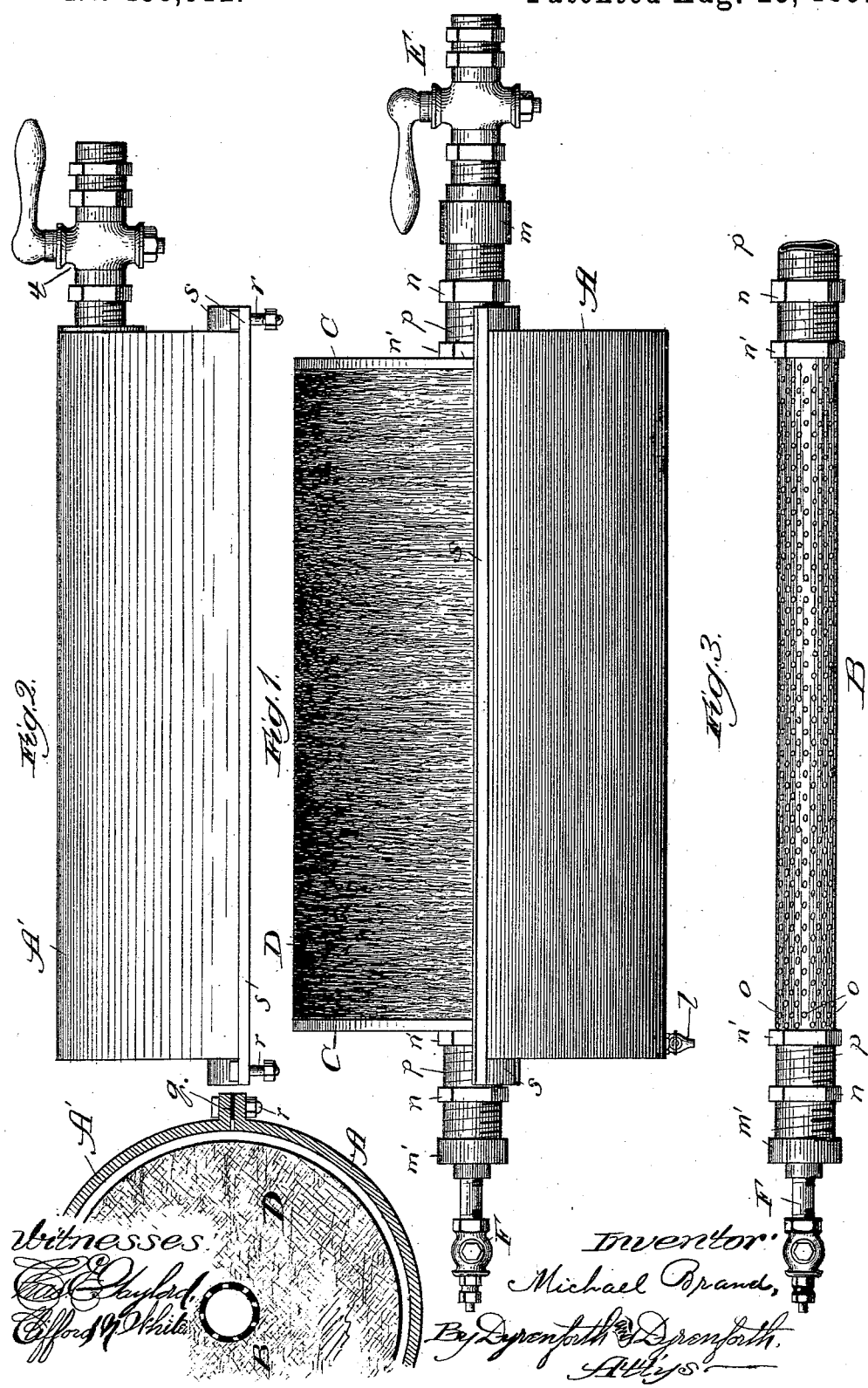

MICHAEL BRAND, OF CHICAGO, ILLINOIS.

FILTER.

SPECIFICATION forming part of Letters Patent No. 458,312, dated August 25, 1891.

Application filed June 16, 1890. Serial No. 355,580. (No model.)

*To all whom it may concern:*

Be it known that I, MICHAEL BRAND, a citizen of the United States, residing at Chicago, in the county of Cook and State of Illinois, have invented a new and useful Improvement in Filters, of which the following is a specification.

My invention relates to filters for any of the usual purposes—that is to say, with the proper connections it may be employed for the filtration of water, beer, or any other liquid requiring clarification.

The object of my invention is to combine with the highest clarifying properties a construction which shall be extremely simple and which shall also afford great facility in the matter of cleansing; and to these ends my invention consists in forming the filter of a horizontal and preferably cylindrical casing provided with a controllable inlet, preferably at one end toward the top, an outlet-pipe extending centrally and longitudinally through the casing, provided with perforations within the confines of the latter and revoluble therein, a filtering medium preferably less in diameter than the interior of the casing, mounted upon the central perforated outlet-pipe, and means on the pipe and casting for locking the pipe against revolution when desired; and it consists, further, in the combination, with the general features of construction above defined, of various auxiliary features of construction, whereby the filtering medium may be compressed to any required degree, and also whereby the air displaced by the inflowing liquid may be expelled, all as hereinafter more fully set forth.

In the accompanying drawings, Figure 1 is a side elevation of my filter with the upper section of the casing removed; Fig. 2, a similar view of the removed portion of the casing; Fig. 3, a similar view of the perforated outlet-pipe detached, and Fig. 4 a vertical interior cross-section of the filter.

A and A' are the upper and lower sections of the casing, which correspond with each other, except that the section A' is provided with a controllable inlet $t$ to connect with the liquid-supply. The meeting edges of the sections A and A' are provided with flanges $s$, through which nut-bolts $r$ pass to secure the parts together, and the joint is rendered water-tight by means of an interposed rubber gasket $q$. The ends of the complete casing are provided with central openings to receive the perforated inlet-pipe B. This pipe is of greater length than the cylinder, so that when in position it projects therefrom at each end, and from its opposite ends it is screw-threaded inward to points within the confines of the casing, as shown at $p$. The perforations $o$ are between the screw-threaded portions. Each screw-threaded end of the pipe is provided with two screw-collars $n$ and $n'$, the purposes of which will be explained farther on.

Mounted loosely upon the pipe B by means of central openings through them are two rigid disks C, each having a diameter less than that of the interior of the casing, and between these rigid disks, which may be formed either of wood or metal, the filtering medium D is interposed, preferably consisting of separate disks of textile fabric, forming in the aggregate the cylinder of fabric represented in the drawings. By means of the screw-collars $n'$ more or less pressure may be exerted against the rigid disks C, thus regulating the compression of the filtering medium D to suit the requirements, according to the degree of facility with which it is desired to have the liquid percolate through the mass. The screw-collars $n$ operate as jam-nuts to abut against the ends of the flanges $s$, and thus hold the pipe B and its attendant parts against longitudinal displacement. By loosening these nuts the pipe B and the filtering medium thereon become revoluble within the casing, thus when the top of the casing is removed rendering the entire surface of the filtering medium accessible for washing. At one end of the pipe B a faucet E is connected by a screw-coupling $m$, and to the other end a valved vent-tube F is similarly secured by means of a screw-coupling $m'$.

The liquid to be filtered is admitted into the interior of the casing through the inlet $t$ under pressure, the vent F being opened to let the air escape. The liquid enters the space intervening between the interior wall of the casing and the filtering medium D, and percolating through the latter enters the interior of the pipe B through the perforations $o$ therein, and may be drawn off by opening the faucet E.

To cleanse the filter, the section A' of the casing is removed and water is admitted under pressure through the faucet E, the course of the liquid being thus reversed, causing the accumulated impurities to be carried outward. Meanwhile, or as required, the filtering-cylinder may be rotated and the surface scoured. A faucet l permits the casing to be drained.

The filter may be mounted upon any suitable frame and may be either rigidly fixed thereon or revoluble on trunnions in the usual and well-known way.

The preferred shape of both the casing and filtering-body is cylindrical, as shown and described; but as to these parts and certain subordinate features the terms indicative of form used in the specification are employed only for convenience of description and not as limitations. Thus the casing and the filtering-body, or either, may be angular instead of cylindrical, and the vent F may take any one of the well-known forms that may be found convenient and desirable. Obviously the inlet t may be formed either upon the section A or the section A' of the casing; but the latter arrangement is preferred, since it removes the inlet farther from the sediment, and for this reason it is the one illustrated.

What I claim as new, and desire to secure by Letters Patent, is—

1. In a filter, the combination of the casing provided with a controllable inlet, a perforated pipe extending centrally through the casing and revoluble therein and provided with a controllable outlet, a filtering medium mounted upon the pipe and revoluble therewith, and nuts n n on the perforated pipe and flanges s on the casing, whereby the casing and pipe are held securely together when the nuts are turned home and are rendered revoluble when the nuts are turned loose and free from the flange, substantially as described.

2. In a filter, the combination of the casing A A', separable longitudinally and provided with a controllable inlet t, perforated pipe B, extending centrally through the casing and provided with a controllable outlet E, a compressible filtering medium mounted upon the pipe B, and adjustable end supports for the filtering medium, substantially as described.

3. In a filter, the combination of the casing A A', separable longitudinally and provided with a controllable inlet t, perforated pipe B, extending centrally through the casing and provided with a controllable outlet E, disks of textile fabric D, mounted upon the pipe B, adjustable end supports for the fabric, and a controllable vent upon the pipe B for permitting the escape of air, substantially as described.

4. In a filter, the combination of the casing A A', separable longitudinally and provided with a controllable inlet t, perforated pipe B, screw-threaded toward opposite ends and extending centrally through the casing and projecting beyond the ends thereof and having at one end a controllable outlet E for liquid and at the opposite end a controllable vent F, screw-collars n and n' upon the threaded portions of the pipe B, rigid disks C upon the pipe B, and disks D, of textile fabric, upon the pipe B between the disks C, substantially as described.

MICHAEL BRAND.

In presence of—
J. W. DYRENFORTH,
M. J. FROST.